(12) United States Patent
Yano

(10) Patent No.: US 11,778,155 B2
(45) Date of Patent: Oct. 3, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomohiro Yano, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/522,508

(22) Filed: Nov. 9, 2021

(65) Prior Publication Data

US 2022/0150457 A1 May 12, 2022

(30) Foreign Application Priority Data

Nov. 11, 2020 (JP) .................................. 2020-188220

(51) Int. Cl.
*H04N 13/111* (2018.01)
*G06T 7/20* (2017.01)
*H04N 5/272* (2006.01)

(52) U.S. Cl.
CPC .............. *H04N 13/111* (2018.05); *G06T 7/20* (2013.01); *H04N 5/272* (2013.01); *G06T 2207/30196* (2013.01); *G06T 2207/30221* (2013.01)

(58) Field of Classification Search
CPC .... H04N 13/111; H04N 5/272; H04N 13/383; H04N 13/279; H04N 13/117; H04N 13/243; G06T 7/20; G06T 2207/30196; G06T 2207/30221
See application file for complete search history.

(56) References Cited

U.S. PATENT DOCUMENTS

| | | | |
|---|---|---|---|
| 2005/0018045 A1* | 1/2005 | Thomas | G06T 15/20 |
| | | | 348/E5.022 |
| 2006/0028476 A1* | 2/2006 | Sobel | G06T 13/00 |
| | | | 345/474 |
| 2019/0279418 A1* | 9/2019 | Sakakima | G06T 15/20 |
| 2020/0234495 A1* | 7/2020 | Nakao | G06T 15/20 |
| 2021/0027496 A1* | 1/2021 | Koyama | H04N 13/246 |
| 2022/0172447 A1* | 6/2022 | Tateno | H04N 5/262 |
| 2022/0319102 A1* | 10/2022 | Tamura | G06T 7/0002 |
| 2022/0329880 A1* | 10/2022 | Zhang | G06T 7/70 |
| 2022/0329912 A1* | 10/2022 | Irie | H04N 5/232 |

FOREIGN PATENT DOCUMENTS

| | | |
|---|---|---|
| JP | 2006310936 A | 11/2006 |
| JP | 2019152957 A | 9/2019 |

* cited by examiner

*Primary Examiner* — Michael Lee
(74) *Attorney, Agent, or Firm* — Canon U.S.A., Inc. IP Division

(57) ABSTRACT

An image processing apparatus includes an acquisition unit configured to acquire line-of-sight information about a movement range of a line of sight of a subject imaged by a plurality of image capturing apparatuses, a determination unit configured to determine virtual viewpoint information indicating a virtual viewpoint related to a virtual viewpoint image that is based on a plurality of captured images acquired by the imaging by the plurality of image capturing apparatuses and that includes the movement range of the line of sight of the subject identified based on the line-of-sight information acquired by the acquisition unit, and an output unit configured to output the virtual viewpoint information determined by the determination unit.

14 Claims, 10 Drawing Sheets

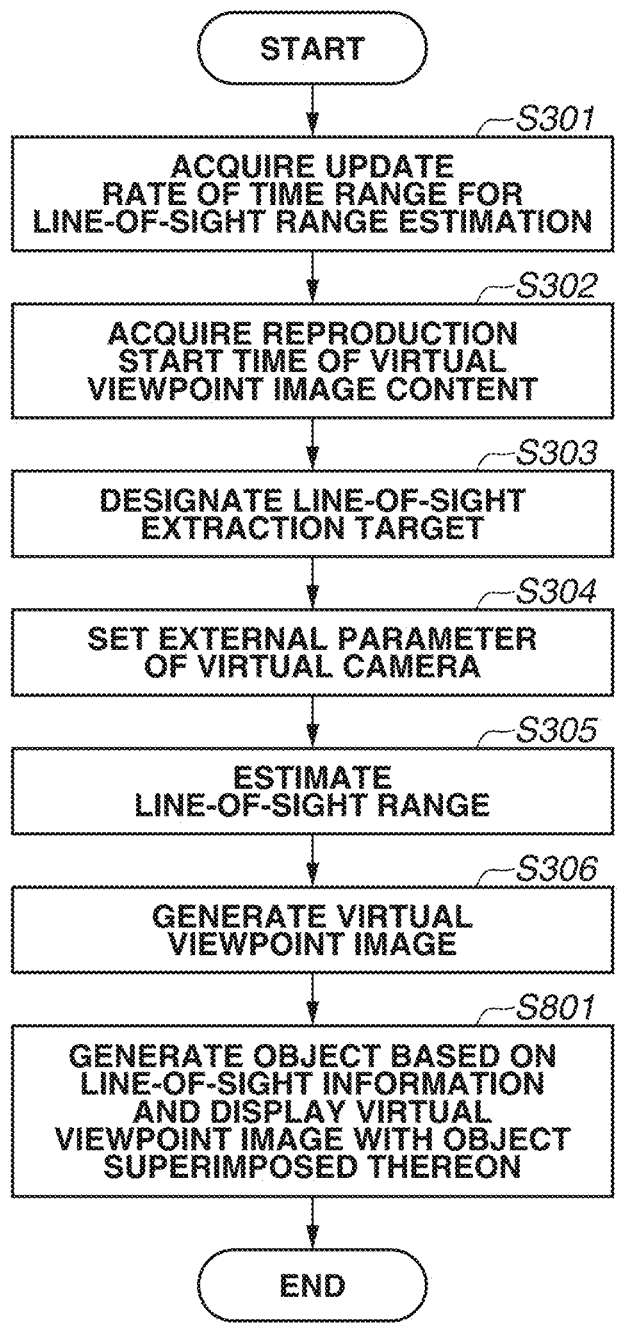

IMAGE PROCESSING APPARATUS, IMAGE PROCESSING METHOD, AND STORAGE MEDIUM

This application claims the benefit of Japanese Patent Application No. 2020-188220, filed Nov. 11, 2020, which is hereby incorporated by reference herein in its entirety.

BACKGROUND

Field

The present disclosure relates to an image processing technique for generating a virtual viewpoint image.

Description of the Related Art

In recent years, attention has been drawn to a technique in which a plurality of viewpoint images is acquired by simultaneous imaging by a plurality of cameras installed at different positions, and based on the acquired viewpoint images, an image viewed from a desired viewpoint, i.e., a virtual viewpoint image corresponding to an image captured by a virtual camera is generated. More specifically, the virtual viewpoint image is generated as follows. A plurality of viewpoint images captured by a plurality of cameras is gathered on an image processing apparatus such as a server. The image processing apparatus then performs processing, such as foreground/background separation, three-dimensional shape estimation, three-dimensional model generation, and rendering, on the gathered viewpoint images, so that the virtual viewpoint image is generated.

The generated virtual viewpoint image is transferred to a user's terminal and displayed on the user's terminal, so that the user (viewer) can view the virtual viewpoint image (virtual viewpoint video image). With this technique, the user can view a highlight scene of a soccer game, a basketball game, or the like from various positions and angles that a conventional technique cannot realize, such as a field during the game, so that the user can feel a higher realistic sensation with the virtual viewpoint image than with a conventional video image. Furthermore, for example, if line-of-sight information about a player or a referee is also acquired and used to generate a virtual viewpoint image and the generated virtual viewpoint image is displayed, it is possible to perform line-of-sight analysis for improving skills of a player or a referee. With the virtual viewpoint image based on the line-of-sight information about a player or a referee, the user (viewer) can virtually experience how and where the player or the referee is looking during the game, and the user can enjoy the game more through the realistic sensation experience. Japanese Patent Application Laid-Open No. 2019-152957 discusses a technique in which a device operation apparatus configured to receive an operation input based on a line of sight receives instructions to correct gaze positions by manual input, and reflects, in line-of-sight detection processing, the mean value of errors of the gaze positions corresponding to the instructions.

However, the line of sight of a player or a referee is sometimes moved rapidly and intensively in vertical and horizontal directions depending on a situation in a game. If a virtual viewpoint image is generated based on information about the line of sight that is moved intensively in vertical and horizontal directions, the generated virtual viewpoint image often contains an intensive movement or a blur, which is not likely to occur in normal camera work. Accordingly, the video image to be viewed by the user may be extremely hard to view. Use of such a virtual viewpoint image may cause, for example, visually-induced motion sickness and is thus not suitable for viewing in some cases. Even with the technique discussed in Japanese Patent Application Laid-Open No. 2019-152957, it is difficult to reduce a movement or a blur in the image based on the line of sight that is intensively moved in vertical and horizontal directions.

SUMMARY

According to one or more aspects of the present disclosure, an image processing apparatus includes an acquisition unit configured to acquire line-of-sight information about a movement range of a line of sight of a subject imaged by a plurality of image capturing apparatuses, a determination unit configured to determine virtual viewpoint information indicating a virtual viewpoint related to a virtual viewpoint image that is based on a plurality of captured images acquired by the imaging by the plurality of image capturing apparatuses and that includes the movement range of the line of sight of the subject identified based on the line-of-sight information acquired by the acquisition unit, and an output unit configured to output the virtual viewpoint information determined by the determination unit.

Further features of the present disclosure will become apparent from the following description of exemplary embodiments with reference to the attached drawings.

BRIEF DESCRIPTION OF THE DRAWINGS

FIG. 8 is a flowchart illustrating processing for generating the virtual viewpoint image according to one or more aspects of the present disclosure.

DESCRIPTION OF THE EMBODIMENTS

Figure 1:
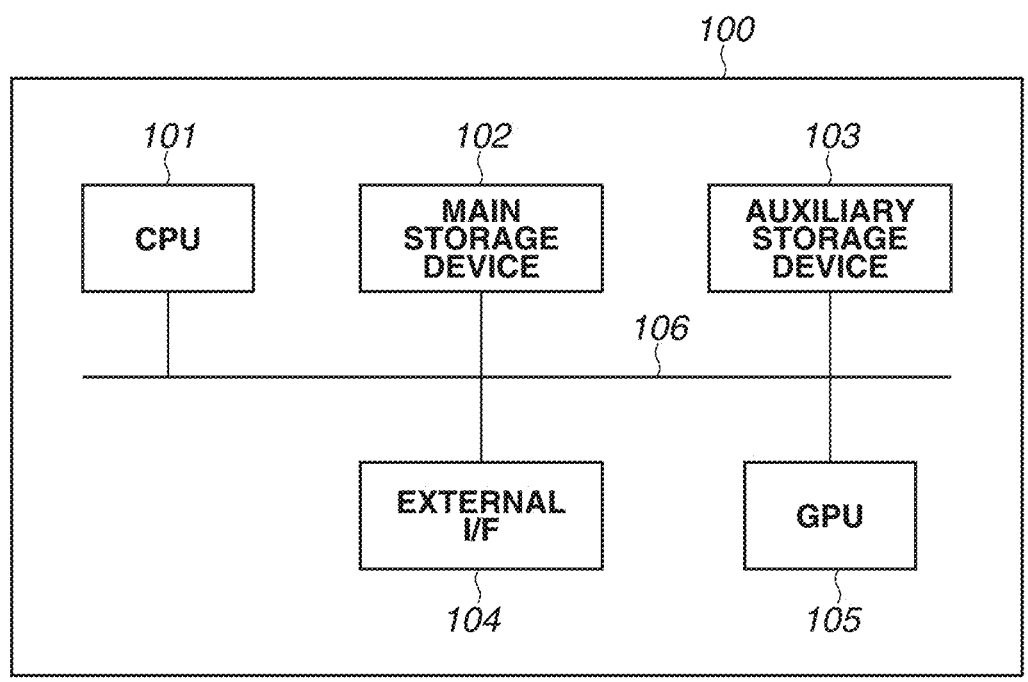
FIG. 1 is a diagram illustrating a hardware configuration of an image processing apparatus according to one or more aspects of the present disclosure.

Various exemplary embodiments of the present disclosure will be described in detail below with reference to the attached drawings. Configurations illustrated in the exemplary embodiments described below are mere examples, and the present disclosure is not limited to the illustrated configurations. Similar components or processes are given the same reference numerals in the exemplary embodiments.

FIG. 1 schematically illustrates a hardware configuration of an image processing apparatus 100 according to a first exemplary embodiment of the present disclosure.

The image processing apparatus 100 includes a central processing unit (CPU) 101, a main storage device 102, an auxiliary storage device 103, an external interface (I/F) 104, a graphics processing unit (GPU) 105, and a bus 106. These hardware components are communicably connected to one another via the bus 106. The bus 106 is formed of a general-purpose bus such as a Peripheral Component Interconnect Express® (PCI Express®) bus.

The CPU 101 performs entire control of the image processing apparatus 100, including various calculations and determinations, image processing control, and data input/output control.

The main storage device 102 functions as a work area of the CPU 101 and a temporary data storage area. The main storage device 102 is implemented by using a storage medium such as a dynamic random access memory (DRAM) or a static random access memory (SRAM).

The auxiliary storage device 103 stores various programs, various types of setting information, various types of image data, camera parameters, three-dimensional shape data, and information such as two-dimensional maps. The auxiliary storage device 103 is implemented by using various storage media. Examples of the storage media include a non-volatile memory such as a read-only memory (ROM) or a flash memory, a hard disk drive (HDD), a solid state drive (SSD), and a tape medium. These storage media may be used in combination for increased capacity or speed or may be combined into a logical unit such as redundant arrays inexpensive disks (RAID).

The external I/F 104 includes a communication interface and an input/output interface. The communication interface is used to communicate with an external device such as a camera, a personal computer (PC), or a server. The input/output interface is used to connect to an external device that receives user's various operations, such as a joystick, a keyboard, a mouse, or a touch panel. The input/output interface is also connected to an external storage to input and output files. The external I/F 104 is implemented by using an interface including a physical cable connection terminal or using a wireless interface. Examples of the interface including a physical cable connection terminal include an InfiniBand interface, an Ethernet interface, and a universal serial bus (USB) interface. Examples of the wireless interface include a wireless local area network (LAN) interface and a Bluetooth® interface.

The GPU 105 is capable of high-speed execution of image processing and calculation, and has a function of outputting a video signal to an external video display apparatus such as a television. In the present exemplary embodiment, the image processing executable by the GPU 105 includes processing for generating a virtual viewpoint image. The virtual viewpoint image is generated by performing processing, such as foreground/background separation, three-dimensional shape estimation, three-dimensional model generation, and rendering, on a plurality of viewpoint images acquired by simultaneous imaging by a plurality of image capturing apparatuses (cameras not illustrated in FIG. 1) installed at different positions. The virtual viewpoint image is generated based on a position of a virtual viewpoint, which is a designated desired viewpoint, and a line-of-sight direction from the virtual viewpoint. For convenience of description, the following description will be given using a virtual camera corresponding to the virtual viewpoint. More specifically, a position of the virtual camera corresponds to the position of the virtual viewpoint, and an orientation (image capturing direction) of the virtual camera corresponds to the line-of-sight direction from the virtual viewpoint. In addition, information indicating the position and orientation of the virtual camera will be referred to as virtual camera information. The virtual camera information includes information indicating the position of the virtual camera and information indicating the orientation of the virtual camera. The virtual camera information may further include information corresponding to a visual field size (angle of view) of the virtual viewpoint. In other words, the virtual viewpoint image is generated based on the virtual camera information. The virtual camera information may be information including at least one of the position information, the orientation information, and the angle-of-view information.

The image processing executable by the GPU 105 also includes processing for rendering an image viewed from the virtual viewpoint, and processing for generating shape data and color information for virtual viewpoint image generation. Data about the plurality of viewpoint images acquired by the plurality of cameras installed at different positions is acquired via, for example, the external I/F 104 and is stored in, for example, the auxiliary storage device 103.

In the present exemplary embodiment, the virtual camera is a camera that is virtually arranged to correspond to a desired viewpoint in a virtual space, and is distinguished from the cameras that are actually installed at different positions in a real space and capture a plurality of viewpoint images. The virtual camera information is generated by the CPU 101 according to the present exemplary embodiment, and details thereof will be described below.

The video signal output of the GPU 105 is implemented by using a video terminal such as a digital visual interface (DVI), a High-Definition Multimedia Interface® (HDMI®), a display port, or a serial digital interface (SDI). Alternatively, the GPU 105 may be configured to not have the video signal output function and to perform only the image processing and the calculation of the shape data and color information for virtual viewpoint image generation. In this case, for example, the external I/F 104 may be configured to execute a video image output function or a data output function for video image output. The GPU 105 may also include a function other than those described above, such as a function of executing a part of the calculations or the entire processing performed by the CPU 101. Furthermore, the GPU 105 may include a storage device different from the main storage device 102.

The configuration of the image processing apparatus 100 according to the present exemplary embodiment is not limited to the above-described configuration illustrated in FIG. 1, and may be implemented by another hardware configuration within the spirit of the present disclosure. For example, the auxiliary storage device 103 may be an external component of the image processing apparatus 100. In this case, the auxiliary storage device 103 may be connected to the image processing apparatus 100 via the external I/F 104. Furthermore, the main storage device 102 and the auxiliary storage device 103 may be implemented as a single piece of hardware. A field programmable gate array (FPGA), a digital signal processor (DSP), or an image processing large-scale integrated circuit (LIS) may be used in place of the GPU 105. The configuration of the image processing apparatus 100 is not limited to a configuration including a single apparatus and may include, for example, a plurality of apparatuses having similar configurations or having different configurations from each other within the spirit of the present disclosure.

Processing for virtual viewpoint image generation that is performed by the image processing apparatus 100 according to the present exemplary embodiment will be described next. The image processing apparatus 100 according to the present exemplary embodiment has a function of performing acquisition processing, determination processing, and generation processing. The acquisition processing is to acquire line-of-sight information. The determination processing is to determine virtual viewpoint information. The generation processing is to generate a virtual viewpoint image. The line-of-sight information acquired in the acquisition processing is information for identifying a line of sight of a subject imaged by the plurality of image capturing apparatuses. The line-of-sight information includes, for example, information indicating the line of sight of the subject such as a player or a referee. The image processing apparatus 100 is capable of identifying a movement range of the line of sight of the subject based on the line-of-sight information. The virtual viewpoint information determined in the determination processing indicates a virtual viewpoint related to a virtual viewpoint image that is based on a plurality of captured images acquired by the imaging by the plurality of image capturing apparatuses and that includes the movement range of the line of sight of the subject identified based on the line-of-sight information acquired in the acquisition processing. In the generation processing, a virtual viewpoint image is generated based on the virtual viewpoint information determined in the determination processing. The image processing apparatus 100 generates a virtual viewpoint image, which is an image virtually captured by a virtual camera represented by virtual camera information including the position, orientation, and angle of view of the virtual camera installed in the virtual space, based on the line-of-sight information about the movement range of the line of sight of the subject (person) on the virtual space. Hereinafter, the movement range of the line of sight of the subject (person) will be referred to as the line-of-sight range for simplification of description.

In the present exemplary embodiment, a case where a virtual viewpoint image is to be generated based on a plurality of viewpoint images acquired by simultaneous imaging of a soccer game by a plurality of real cameras installed at different positions, and line-of-sight information about players and referees is also acquired and used to generate the virtual viewpoint image will be described as an example. In this case, as described above, the lines of sight of players and referees may move rapidly and significantly in vertical and horizontal directions, and a virtual viewpoint image generated using the line-of-sight information may contain an intense movement or may be blurred. According to the technique discussed in Japanese Patent Application Laid-Open No. 2019-152957, the mean value of errors of gaze positions is reflected in line-of-sight detection processing based on manual input using a button operation. However, for example, in the case of a soccer game, there is no region to be gazed at such as that in the case of the button operation. In addition, the intensive movement of the lines of sight of players and referees is not due to blur at a gaze position but due to gazing at many locations within a short time. Thus, in a case where the intensive movement of the lines of sight is corrected as a blur using the technique discussed in Japanese Patent Application Laid-Open No. 2019-152957, destinations of the lines of sight of the players or the referees may become unknown, and the original purpose of enabling the user to virtually view the fields of vision of players and referees cannot be achieved. The user according to the present exemplary embodiment is not only a viewer virtually experiencing the fields of vision of players and referees during a game but also a player or referee viewing virtual viewpoint images to improve his/her skills.

To address this issue, the image processing apparatus 100 according to the present exemplary embodiment has functions illustrated in FIG. 2 and performs processing illustrated in a flowchart in FIG. 3 to be described below, thereby enabling generation of a virtual viewpoint image with reduced intensive horizontal and vertical movements and reduced blurs. The image processing apparatus 100 according to the present exemplary embodiment acquires line-of-sight information about the movement range of the line of sight of a person in the virtual space, and sets virtual camera information about a virtual camera corresponding to virtual viewpoint information related to a virtual viewpoint image including the movement range of the line of sight of the person identified based on the acquired line-of-sight information. Then, the image processing apparatus 100 generates the virtual viewpoint image corresponding to the image captured by the virtual camera with the set virtual camera information.

Figure 2:
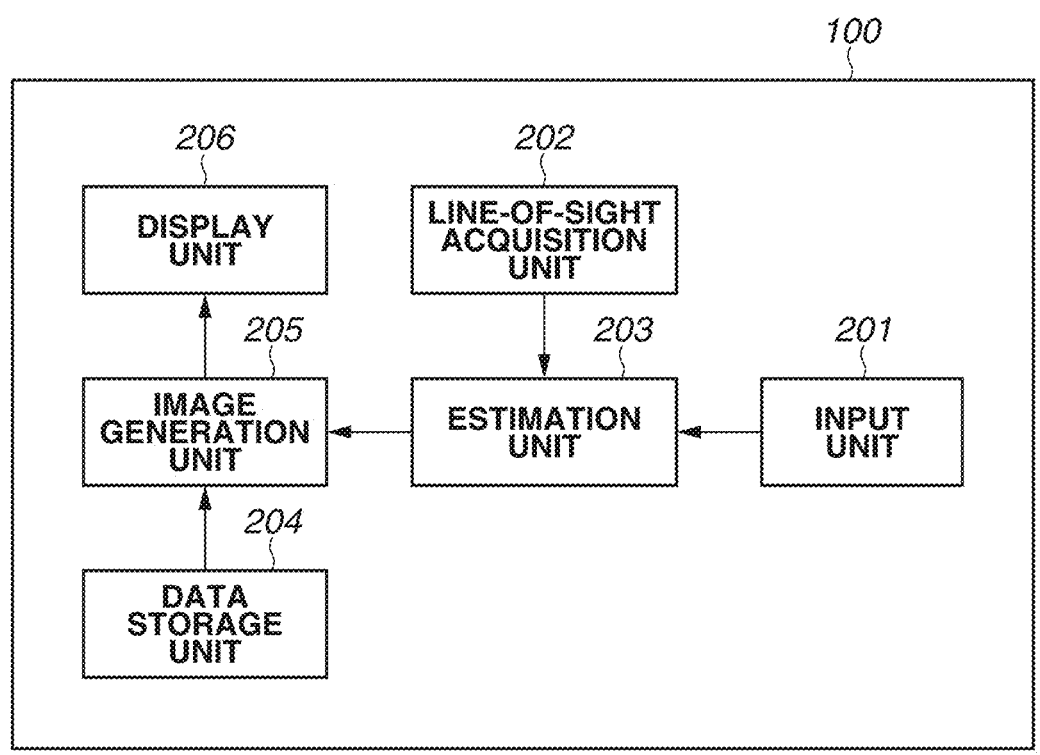
FIG. 2 is a functional block diagram illustrating the image processing apparatus according to one or more aspects of the present disclosure.

FIG. 2 is a functional block diagram illustrating a functional configuration of the image processing apparatus 100 according to the present exemplary embodiment. As illustrated in FIG. 2, the image processing apparatus 100 includes, as functional units, an input unit 201, a line-of-sight acquisition unit 202, an estimation unit 203, a data storage unit 204, an image generation unit 205, and a display unit 206. The functional units illustrated in FIG. 2 and the processing illustrated in the flowchart in FIG. 3 are implemented by, for example, the CPU 101 of FIG. 1 executing processing based on a program according to the present exemplary embodiment that is stored in the auxiliary storage device 103.

The input unit 201, including the external I/F 104, acquires operation information about a user's operation, and acquires a user's input for various instructions based on the operation information. Examples of the user's input based on the operation information include video operations such as selecting, reproducing, stopping, fast-forwarding, and cueing (with timecode designation) virtual viewpoint image content, and camera control operations. In the present exemplary embodiment, the user's input based on the operation information also includes an instruction to select (designate) a desired person such as a player or a referee for which a virtual viewpoint image is to be generated using line-of-sight information, and an instruction about an update rate to update a time range for line-of-sight range estimation to be described below.

The line-of-sight acquisition unit 202 acquires line-of-sight information about a person that is a possible target for virtual viewpoint image generation on the virtual space, i.e., a person (player or referee) on a soccer field in the example according to the present exemplary embodiment. For example, the line-of-sight acquisition unit 202 acquires the line-of-sight information about a player or a referee by using information output from a sensor worn by the player or the referee during a game, or by analyzing a plurality of viewpoint images. In a case where the line-of-sight information is acquired in advance and stored in the auxiliary storage device 103 or an external medium, the line-of-sight acquisition unit 202 may acquire the line-of-sight information from the auxiliary storage device 103 or a medium or a network connected to the external I/F 104. In the present exemplary embodiment, the line-of-sight acquisition unit 202 acquires the line-of-sight information every unit time such as a moving image frame period.

The estimation unit 203 sets the virtual camera information for determining an image capturing range of the virtual camera installed in the virtual space. In the present exemplary embodiment, the estimation unit 203 acquires a user's input from the input unit 201, and acquires line-of-sight information from the line-of-sight acquisition unit 202. Based on the user's input acquired from the input unit 201, the estimation unit 203 identifies a person, such as a player or a referee, which is selected (designated) by the user as a target for virtual viewpoint image generation using line-of-sight information. Then, the estimation unit 203 estimates the movement range of the line of sight of the identified person (hereinafter, also referred to as the line-of-sight range) in a predetermined time range (predetermined period) set in advance, and sets virtual camera information so as to include a plurality of the line-of-sight ranges estimated from an eye position of the person. The virtual camera information includes camera parameters (referred to as virtual camera parameters) of the virtual camera that virtually captures an image of the virtual space, and includes at least parameters for setting the position, orientation, image capturing direction, and angle of view of the virtual camera.

At this time, the estimation unit 203 acquires a movement locus of the line of sight of the person identified based on the user's input, based on the line-of-sight information that is acquired by the line-of-sight acquisition unit 202 every unit time such as the frame period. Details thereof will be described below. The estimation unit 203 further estimates the line-of-sight range, i.e., the movement range of the line of sight of the person in the predetermined time range, based on the locus of the line of sight of the person in the predetermined time range. Then, the estimation unit 203 sets virtual camera information (virtual camera parameters) so as to include the plurality of line-of-sight ranges estimated from the eye position of the person. The predetermined time range may be determined in advance, or a desired time range may be designated as the predetermined time range by the user. The foregoing processing of the estimation unit 203 is performed by, for example, the CPU 101 in the configuration illustrated in FIG. 1.

The data storage unit 204 stores data containing three-dimensional model data and color information in the auxiliary storage device 103. In the present exemplary embodiment, the image generation unit 205 generates a virtual viewpoint image corresponding to an image of the virtual space captured by the virtual camera, based on the virtual camera parameters set by the estimation unit 203 based on the line-of-sight ranges. At this time, the image generation unit 205 acquires the data containing three-dimensional model data and color information from the data storage unit 204 and generates a virtual viewpoint image, which is an image virtually captured by the virtual camera, based on the acquired data. The virtual viewpoint image generation processing of the image generation unit 205 is performed by, for example, the GPU 105 in the configuration illustrated in FIG. 1.

The display unit 206 displays the virtual viewpoint image generated by the image generation unit 205, on a monitor of a television receiver or a personal computer or a tablet terminal via the external I/F 104. This enables the user to view the virtual viewpoint image.

Figure 3:
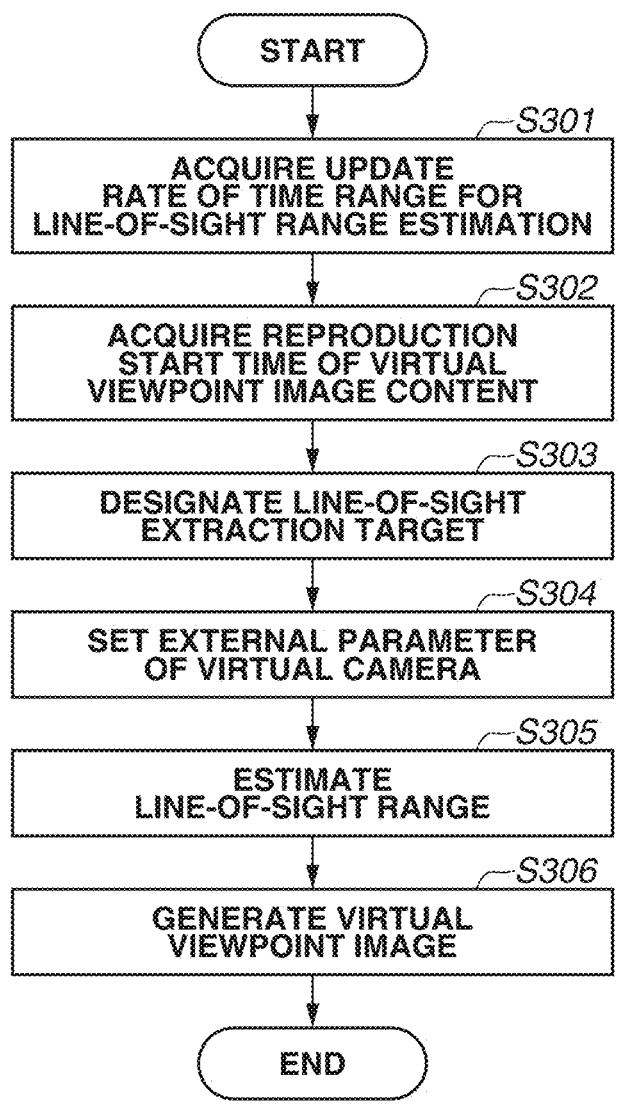
FIG. 3 is a flowchart illustrating processing for generating a virtual viewpoint image according to one or more aspects of the present disclosure.

FIG. 3 is a flowchart illustrating processing for calculating the line-of-sight range and generating the virtual viewpoint image, which is performed by the image processing apparatus 100 according to the present exemplary embodiment. The processing will be described using this flowchart and an example in which the image processing apparatus 100 generates the virtual viewpoint image corresponding to, for example, the line of sight of a chief referee 401 (see FIG. 4) in a soccer game.

In step S301, the input unit 201 acquires the update rate of the time range for estimating the line-of-sight range, based on information input by a user's operation. Information about the update rate of the time range is then transmitted to the estimation unit 203. In the present exemplary embodiment, the time range for estimating the line-of-sight range is set to, for example, one second.

Next, in step S302, the input unit 201 acquires the reproduction start time of the virtual viewpoint image content designated by the user, based on the information input by the user's operation. Information about the reproduction start time of the virtual viewpoint image content is then transmitted to the image generation unit 205 via the estimation unit 203. For example, in a case where the user issues an instruction to cue the virtual viewpoint image content, the image generation unit 205 reproduces the virtual viewpoint image content from the head time of the virtual viewpoint image content.

Next, in step S303, the input unit 201 acquires information indicating the person designated (selected) as the line-of-sight extraction target for virtual viewpoint image generation using line-of-sight information, based on the information input by the user's operation. Information about the person designated as the line-of-sight extraction target is then transmitted to the estimation unit 203.

Figure 4:
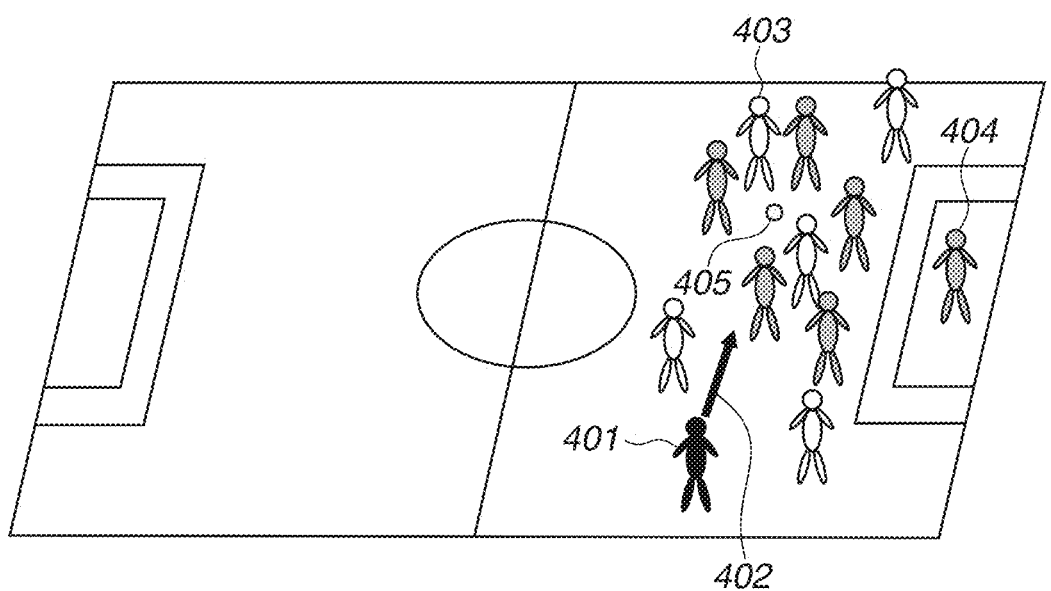
FIG. 4 is a diagram schematically illustrating a scene of a soccer game.

FIG. 4 schematically illustrates a scene of the soccer game.

In designating the line-of-sight extraction target in step S303, for example, a screen displaying a scene such as that illustrated in FIG. 4 is displayed on the display unit 206, so that the user can select a person on the screen by using a pointing device such as a mouse or a touch panel. In the present exemplary embodiment, the chief referee 401 is assumed to be designated as the line-of-sight extraction target by the user. At this time, the chief referee 401 faces a direction of a ball 405 (direction indicated by an arrow 402). While the chief referee 401 on the field is designated in this example, the line-of-sight extraction target is not limited to a chief referee. For example, a player 403 or a goalkeeper 404 can be designated as the line-of-sight extraction target.

Next, in step S304, the estimation unit 203 extracts world coordinates of the position between the eyebrows of the person designated as the line-of-sight extraction target (the chief referee 401 in the example of FIG. 4) by performing processing such as face detection, and sets the extracted world coordinates as an external parameter of the virtual camera. In the present exemplary embodiment, the estimation unit 203 sets the world coordinates of the position between the eyebrows of the person as the virtual camera parameter that indicates the position of the virtual camera. While in the present exemplary embodiment, the world coordinates of the position between the eyebrows are set as the virtual camera parameter indicating the position of the virtual camera, the virtual camera parameter indicating the position of the virtual camera is not limited thereto. For example, the positions of the right and left eyeballs may be detected to set the position of one of the eyeballs or the positions of both of the eyeballs as the virtual camera parameter indicating the position of the virtual camera. For example, in a case where the positions of both of the eyeballs are used, two images having parallax can be generated as a virtual viewpoint image. Alternatively, for example, the position of the central portion of the head or a position near the top of the head may be used. As for the position of the virtual camera in the height direction, a specific value (height) may be given to each person such as a player or a referee, or the same specific value (height) may be given to all players and referees.

Next, in step S305, the estimation unit 203 estimates the line-of-sight range by using the line-of-sight information about the person designated in step S303 (the chief referee 401 in the example of FIG. 4) to extract the locus of the line of sight within the time range (i.e., one second) acquired in step S301. Based on the estimated line-of-sight range, the estimation unit 203 obtains virtual camera information (virtual camera parameters) other than the position of the virtual camera set in step S304, for use in virtual imaging by the virtual camera at the set position.

FIGS. 5A to 5E schematically illustrate how the line-of-sight range of the chief referee 401 illustrated in FIG. 4 is estimated and the virtual camera parameters are obtained based on the line-of-sight range. In FIGS. 5A to 5E, each dotted line indicates the locus of the center of the line of sight of the chief referee 401 that moves with the passage of time.

Figure 5A:
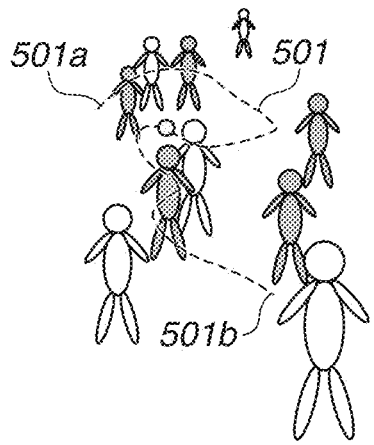
FIGS. 5A to 5E are diagrams illustrating estimation of a line-of-sight range of a chief referee.

A locus 501 of the line of sight illustrated in FIG. 5A is a locus in a case where the chief referee 401 moves the line of sight directed toward a line-of-sight position 501a, with the passage of time as indicated by a dotted line in FIG. 5A and after two seconds the light of sight is at a line-of-sight position 501b. Persons such as players are illustrated in a motionless state in FIGS. 5A to 5E, but each of the persons is actually moving with time.

Figure 5B:
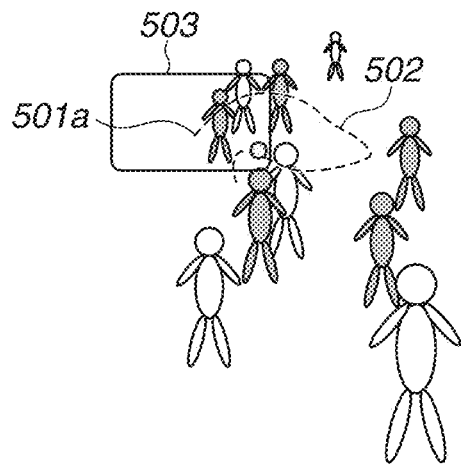

FIG. 5B illustrates a line-of-sight range 503 that is estimated for a time t1 within the visual field of the chief referee 401 in the example where the line of sight of the chief referee 401 is moved from the line-of-sight position 501a to the line-of-sight position 501b as indicated by the locus 501 of FIG. 5A. A locus 502 illustrated in FIG. 5B is the locus of the line of sight acquired at the time t1, and indicates the locus of the line of sight moved in the one-second time range set in step S301. The one-second time range from a time t1-1 to the time t1 is the time range for line-of-sight estimation, and the line-of-sight position 501a indicates the central position of the line of sight of the chief referee 401 at the time t1-1. The line-of-sight range 503 indicated by a solid frame in FIG. 5B indicates the line-of-sight range estimated within the visual field of the chief referee 401 at the line-of-sight position 501a. At this time, the line-of-sight range 503 estimated with respect to the center of the line of sight in the visual field of the chief referee 401 is an effective visual field range excluding a range referred to as a peripheral visual field, and is set to an average angle of view.

Figure 5C:
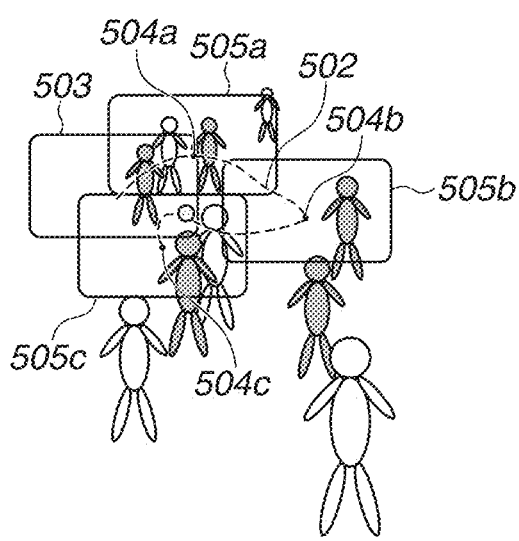

FIG. 5C illustrates sequential acquisition of effective visual field ranges along the locus 502 in a similar manner as described above. A line-of-sight range 505a is the line-of-sight range that is estimated as the effective visual field range of the chief referee 401 in a case where the central position of the line of sight of the chief referee 401 is moved from the line-of-sight position 501a to a line-of-sight position 504a with the passage of time. Similarly, a line-of-sight range 505b is the line-of-sight range that is estimated in a case where the central position of the line of sight is moved from the line-of-sight position 504a to a line-of-sight position 504b, and a line-of-sight range 505c is the line-of-sight range that is estimated in a case where the central position of the line of sight is moved from the line-of-sight position 504b to a line-of-sight position 504c.

As described above, the estimation unit 203 sequentially estimates line-of-sight ranges along the locus 502 of the line of sight during one second from the time t1-1 to the time t1. Then, as illustrated in FIG. 5D, the estimation unit 203 acquires a range that includes all the angles of view of the effective visual fields of the line-of-sight ranges estimated along the locus 502 of the line of sight during one second from the time t1-1 to the time t1, as an inclusive line-of-sight range 506 at the time t1.

Furthermore, the estimation unit 203 estimates the virtual camera parameters other than the position of the virtual camera at the time t1, based on the angle of view corresponding to the inclusive line-of-sight range 506 at the time t1. The line-of-sight ranges estimated in the time range from the time t1-1 to the time t1 may not necessarily be inscribed in the inclusive line-of-sight range 506 and the inclusive line-of-sight range 506 may be any other shape as long as all the line-of-sight ranges are included in the inclusive line-of-sight range 506. In addition, the virtual camera parameters may correspond to a shape with an aspect ratio of 16:9 or 4:3 for general video signals or an aspect ratio of 3:2 for pictures. Alternatively, the inclusive line-of-sight range 506 may be minimized as long as all the line-of-sight ranges are included at such an aspect ratio.

Figure 5D:
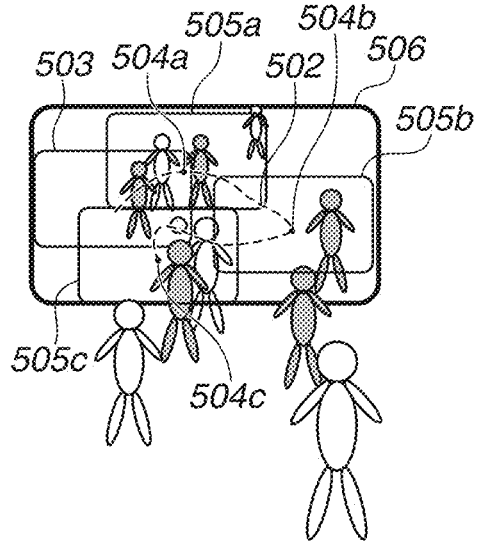

The estimation unit 203 sets a time t2 as a time one second after the time t1 (as a time after the line-of-sight estimation time range from the time t1), and obtains an inclusive line-of-sight range during one second from a time t2-1 (i.e., the time t1) to the time t2, similarly to the case of the inclusive line-of-sight range 506 illustrated in FIG. 5D. An inclusive line-of-sight range 507 illustrated in FIG. 5E indicates the inclusive line-of-sight range obtained during one second from the time t2-1 to the time t2. Then, the estimation unit 203 estimates the virtual camera parameters other than the position of the virtual camera at the time t2, based on the angle of view corresponding to the inclusive line-of-sight range 507 at the time t2. Similarly, each time the time range is updated, i.e., for each update rate, the estimation unit 203 obtains an inclusive line-of-sight range and sets virtual camera parameters.

Returning to the flowchart in FIG. 3, in step S306, the image generation unit 205 renders a virtual viewpoint image by using the virtual camera parameters corresponding to the inclusive line-of-sight ranges at the time t1 and the time t2 that are received from the estimation unit 203. Then, the display unit 206 displays the virtual viewpoint image.

Information received by the image generation unit 205 at this time is a combination of time information about the time t1 and the time t2 and the virtual camera parameters corresponding to the inclusive line-of-sight ranges 506 and 507 associated with the time information. Since the virtual viewpoint image contains, for example, sixty frames per second in a case where the time interval between the time t1 and the time t2 is one second, the image generation unit 205 is to generate an image corresponding to sixty frames as the virtual viewpoint image between the time t1 and the time t2.

To generate the virtual viewpoint image, the image generation unit 205 gradually changes the virtual camera information between first virtual camera information set for the predetermined time range of the time t1 and second virtual camera information set for the time range of the time t2 that is different from the time range of the time t1 by the time of the update rate. For example, the image generation unit 205 determines the first virtual camera information and the second virtual camera information as the virtual camera information for key frames, and acquires the virtual camera information complemented for each time obtained by dividing the predetermined time range by the number of frames for displaying the virtual viewpoint image. In the present exemplary embodiment, the image generation unit 205 determines the virtual camera parameters at the time t1 and the time t2 acquired from the estimation unit 203 as the virtual camera parameters for key frames, and generates intermediate data for complementing the virtual camera parameters between the virtual camera parameters at the time t1 and the time t2. The intermediate data is generated so as to gradually change from the virtual camera parameters at the time t1 to the virtual camera parameters at the time t2. In the present exemplary embodiment, in a case where, among the virtual camera parameters set by the estimation unit 203, especially the angle of view changes to a narrow angle, the image generation unit 205 gradually changes the angle of view. As a result, the image generation unit 205 generates the virtual viewpoint image based on the virtual camera parameters that gradually change during one second from the time t1 to the time t2, i.e., the virtual viewpoint image corresponding to sixty frames and changing gradually from the time t1 to the time t2.

FIGS. 6A to 6D illustrate how the virtual viewpoint image is generated by complementing the virtual camera parameters for each frame between the inclusive line-of-sight range 506 at the time t1 and the inclusive line-of-sight range 507 at the time t2 that are obtained by the estimation unit 203 as described above. While one second is divided into four in the examples illustrated in FIGS. 6A to 6D due to the limited space, the virtual viewpoint image corresponding to sixty frames is actually generated.

Figure 5E:
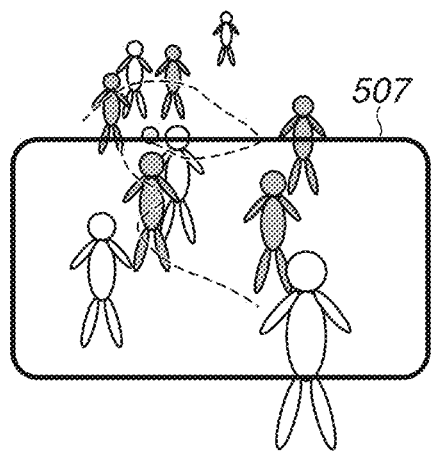
Figure 6A:
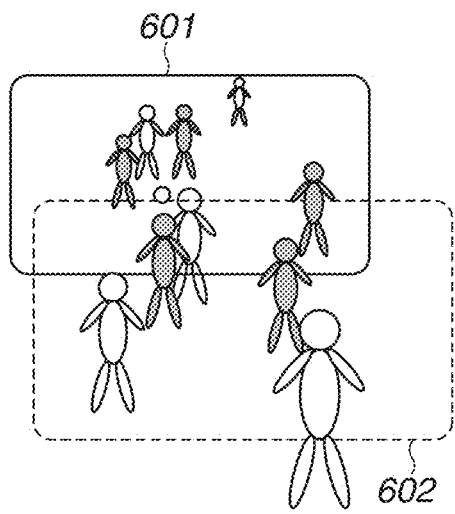
FIGS. 6A to 6D are diagrams illustrating complementation of a virtual camera parameter in generating the virtual viewpoint image.

FIG. 6A illustrates an angle of view 601 in generating the virtual viewpoint image at the time t1. At the time t1, the virtual viewpoint image corresponding to the angle of view 601 of the inclusive line-of-sight range 506 illustrated in FIG. 5D is generated. In FIG. 6A, the inclusive line-of-sight range 507 illustrated in FIG. 5E is also illustrated as an angle of view 602 that is indicated by a dotted line as the angle of view in generating the virtual viewpoint image at the time t2.

Figure 6B:
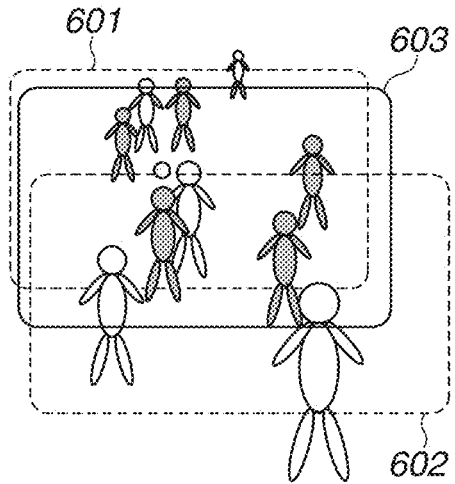

FIG. 6B illustrates an angle of view 603 at a time t1+Δ1 at which a time Δ1 has passed since the time t1. The time Δ1 is shorter than the line-of-sight estimation time range, i.e., one second. The time t1+Δ1 is the time between the time t1 and the time t2. Since the virtual camera parameters corresponding to the time t1+Δ1 between the time t1 and the time t2 are not estimated by the estimation unit 203, the image generation unit 205 cannot acquire the virtual camera parameters corresponding to the time t1+Δ1. Thus, intermediate data for complementing the virtual camera parameters corresponding to the time t1+Δ1 is generated with the virtual camera parameters at the time t1 and the time t2 as the virtual camera parameters for key frames.

The angle of view 603 at the time t1+Δ1 is set as an intermediate angle of view between the angle of view 601 at the time t1 and the angle of view 602 at the time t2. In the present exemplary embodiment, the image generation unit 205 evenly linearly divides a value between a value representing the angle of view 601 at the time t1 and a value representing the angle of view 602 at the time t2 by the number of frames for generating the virtual viewpoint image. The image generation unit 205 further determines the angle of view represented by the value corresponding to the time t1+Δ1 among the values representing the angles of view obtained by the division, as the angle of view 603 at the time t1+Δ1. Then, the image generation unit 205 generates the virtual viewpoint image based on the virtual camera parameters corresponding to the angle of view 603. Alternatively, the image generation unit 205 may divide the value between the two values representing the angle of view 601 at the time t1 and the angle of view 602 at the time t2 so as to draw a Bézier curve or a sine curve using complementation for curvilinear acceleration or deceleration. Furthermore, the complementation is not limited to those described above, and any complementation method can be employed as long as the virtual parameters complemented to be the intermediate values between the virtual camera parameters at the time t1 and the time t2 can be acquired.

Figure 6C:
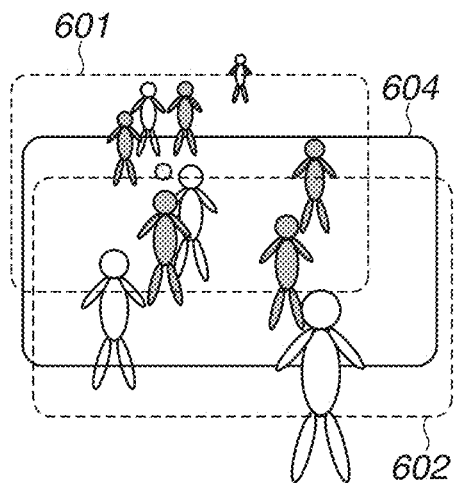

FIG. 6C illustrates an angle of view 604 at a time t1+Δ2 at which a time has passed since the time t1+Δ1. The angle of view 604 at the time t1+Δ2 illustrated in FIG. 6C is obtained using a complementation method similar to the above-described method, and is closer to the angle of view 602 at the time t2 than the angle of view 603 at the time t1+Δ1.

Figure 6D:
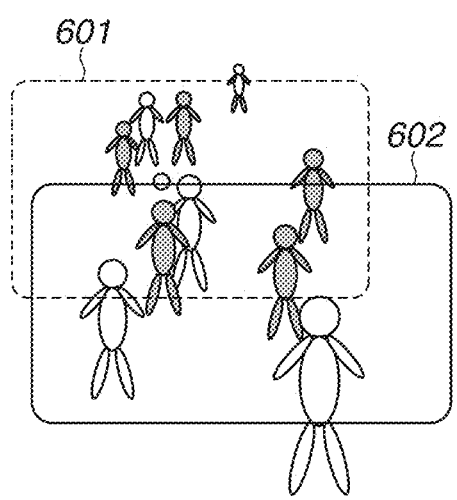

Thereafter, at the time t2, the angle of view 602 as illustrated in FIG. 6D is obtained. The image generation unit 205 complements the virtual camera parameters between the time t1 and the time t2 as described above with reference to FIGS. 6A to 6C, and generates the virtual viewpoint image based on the virtual parameters.

As described above, the image processing apparatus 100 according to the present exemplary embodiment obtains virtual camera parameters based on the line-of-sight ranges estimated based on the locus of the line of sight in each predetermined time range, and generates the virtual viewpoint image based on the virtual camera parameters. As a result, it is possible to generate the virtual viewpoint image, which is assumed to be viewed from the line of sight of the person designated as the line-of-sight extraction target, while preventing, in generating the virtual viewpoint image corresponding to the line of sight of the designated person, an intensive movement in the image.

While in the present exemplary embodiment, for example, the inclusive line-of-sight range 506 at the time t1 is estimated based on the line-of-sight information at and before the time t1 that corresponds to the time range, the estimation method is not limited thereto. The inclusive line-of-sight range 506 may be obtained based on the line-of-sight information at and after the time t1. Alternatively, for example, in a case where the estimation is performed using the one-second time range as described above, any method may be employed as long as the line-of-sight estimation range is obtained based on the line-of-sight information during a continuous period of one second, such as a period before and after the time t1 including the time t1, i.e., a 0.5-second period before and after the time t1.

Furthermore, in the present exemplary embodiment, the angle of view corresponding to the inclusive line-of-sight range may include the detected locus of the line of sight and be the narrowest angle of view based on the aspect ratio of an output video image in the viewing angle. Furthermore, the angle of view corresponding to the inclusive line-of-sight range may be an angle of view that is obtained by enlarging the narrowest angle of view in a predetermined range based on a user's instruction.

While in the present exemplary embodiment, the line-of-sight range is set to an average angle of view as the effective visual field excluding the range referred to as the peripheral visual field, the line-of-sight range is not limited thereto. For example, the line-of-sight range may be obtained using a narrower angle of view such as using the angle considered as the viewing angle of the central fovea with respect to line-of-sight information. Furthermore, the effective visual field may be an angle of view including a desired viewing angle set based on a users instruction as long as a range including the center of the line of sight is set as the effective visual field.

While in the present exemplary embodiment, the image processing apparatus 100 has been described to include the image generation unit 205 and the display unit 206, the configuration is not limited thereto. For example, at least one of the image generation unit 205 and the display unit 206 may be externally connected to the image processing apparatus 100, as a separate device. In a case where both the image generation unit 205 and the display unit 206 are externally connected to the image processing apparatus 100, the image generation unit 205 and the display unit 206 may be formed integrally or separately. In other words, the image processing apparatus 100 at least determines virtual camera parameters using the estimation unit 203, and outputs the virtual camera parameters to a processing unit or another apparatus configured to generate a virtual viewpoint image.

Figure 7:
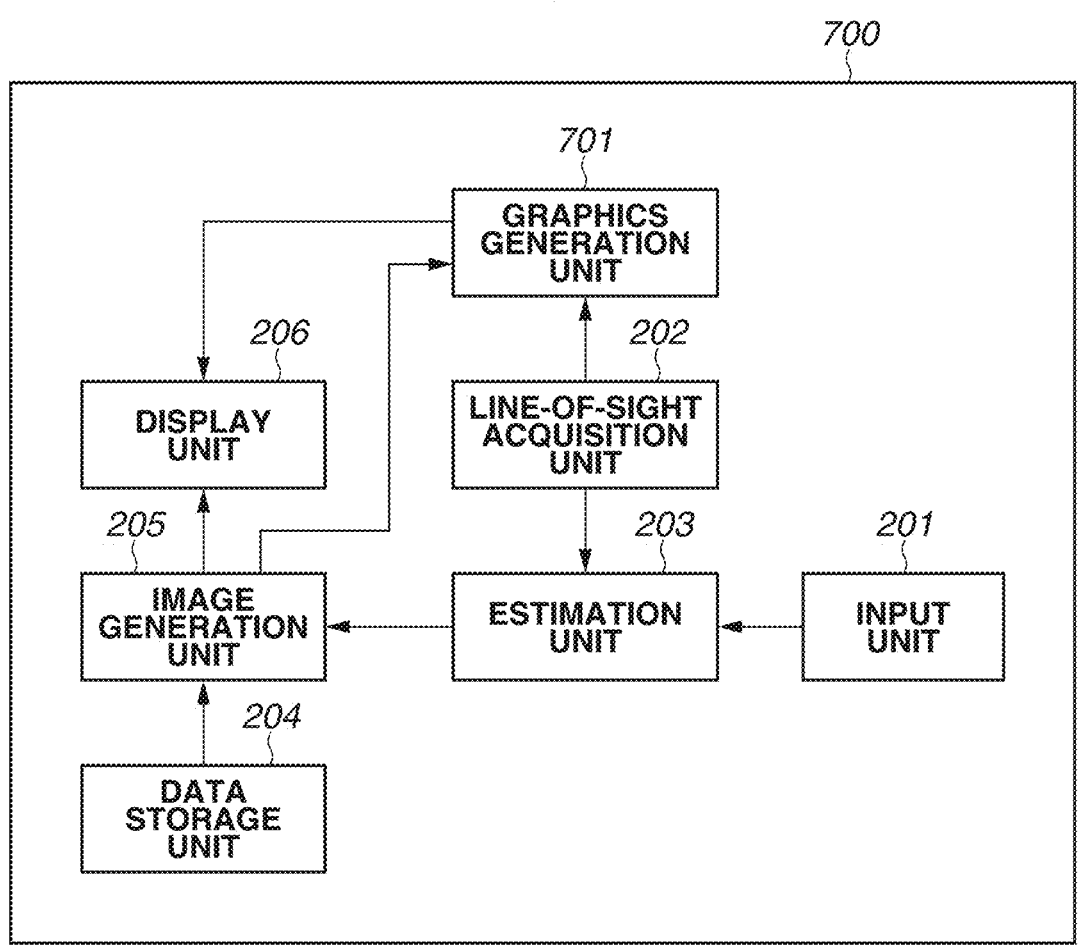
FIG. 7 is a functional block diagram illustrating an image processing apparatus according to one or more aspects of the present disclosure.

FIG. 7 is a functional block diagram illustrating a functional configuration of an image processing apparatus 700 according to a second exemplary embodiment. The input unit 201 to the display unit 206 of the image processing apparatus 700 are similar to the corresponding functional units of the image processing apparatus 100 illustrated in FIG. 2, and thus redundant descriptions thereof will be omitted. A hardware configuration of the image processing apparatus 700 according to the present exemplary embodiment is also similar to the configuration illustrated in FIG. 1, and thus redundant illustrations and descriptions thereof will be omitted.

A graphics generation unit 701 acquires the line-of-sight information acquired by the line-of-sight acquisition unit 202, the inclusive line-of-sight range information estimated by the estimation unit 203, and the virtual camera parameters used by the image generation unit 205 in virtual viewpoint image generation. Based on the acquired pieces of information, the graphics generation unit 701 generates graphics data for displaying, for example, the line of sight, the locus of the line of sight, the gaze point or gaze range of the person designated as the line-of-sight extraction target, and the like, and transmits the generated graphics data to the display unit 206. Then, the display unit 206 displays graphics such as the line of sight, the locus of the line of sight, the gaze point, or the line-of-sight range.

FIG. 8 is a flowchart illustrating processing for calculating the line-of-sight range, generating the virtual viewpoint image, and displaying graphics, which is performed by the image processing apparatus 700 according to the present exemplary embodiment. In the flowchart of FIG. 8, steps S301 to S306 are similar to the corresponding steps in FIG. 3, and thus redundant descriptions thereof will be omitted. In the flowchart of FIG. 8, after step S306, the processing proceeds to step S801.

In step S801, the graphics generation unit 701 acquires the time of the virtual viewpoint image generated by the image generation unit 205 and the virtual camera parameters, the line-of-sight information acquired by the line-of-sight acquisition unit 202, and the inclusive line-of-sight range information estimated by the estimation unit 203. Based on the acquired pieces of information, the graphics generation unit 701 generates graphics data for display on the display unit 206. More specifically, the graphics generation unit 701 performs related image generation processing for generating an object as an image related to the line of sight of the person designated as the line-of-sight extraction target such as the chief referee 401. The display unit 206 displays the virtual viewpoint image generated by the image generation unit 205 and the object generated by the graphics generation unit 701 based on the graphics data, in a state where the object is superimposed on the virtual viewpoint image. While in the present exemplary embodiment, the display unit 206 displays the virtual viewpoint image with the object superimposed thereon, the configuration is not limited thereto. For example, the image generation unit 205 may perform processing for superimposing the object on the virtual viewpoint image, and the display unit 206 may display the image generated by the image generation unit 205.

Figure 9A:
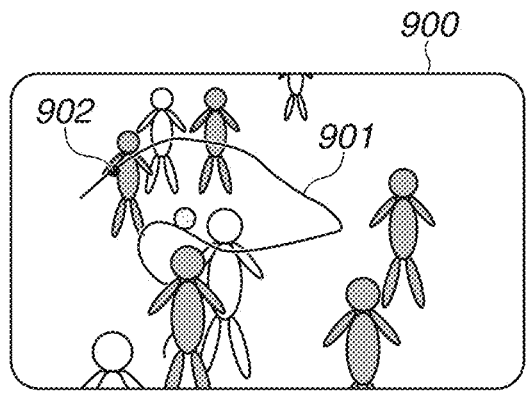
FIGS. 9A to 9C are diagrams each illustrating an example of a display of an object related to a line of sight.
Figure 9B:
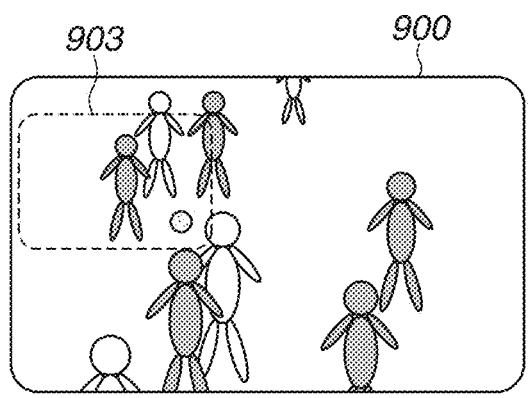
Figure 9C:
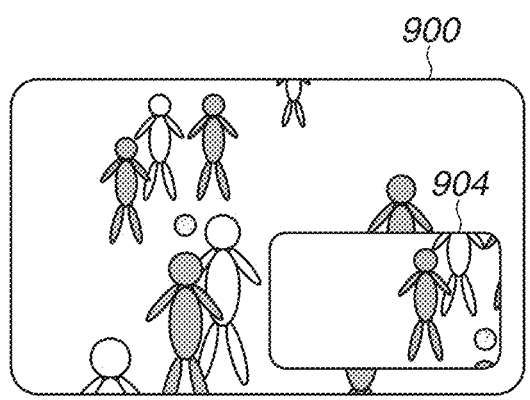

FIGS. 9A to 9C each schematically illustrate a virtual viewpoint image 900 that is displayed with an object superimposed thereon. Each object is displayed as an image related to the line of sight of the chief referee 401 who is the person designated as the line-of-sight extraction target. FIGS. 9A, 9B, and 9C illustrate examples of different display forms of the object related to the line of sight of the chief referee 401.

FIG. 9A illustrates a display example where a locus object 901 indicating the locus of the line of sight of the chief referee 401 is superimposed on the virtual viewpoint image 900 that is generated based on the virtual camera parameters corresponding to the inclusive line-of-sight range 506 at the time t1. Such display enables the user to know the gaze range of the chief referee 401 while having a bird's-eye view of the gaze position of the chief referee 401 at a given time in the estimated inclusive line-of-sight range of the chief referee 401. At this time, the graphics generation unit 701 may highlight the position (gaze position) of the line of sight at the time when the virtual viewpoint image is generated, for example, as indicated by a point object 902. Furthermore, for example, the graphics generation unit 701 may represent the movement of the line of sight by using the point object 902, and display the locus object 901 as the locus of the movement of the line of sight. The graphics generation unit 701 may also display the locus object 901 so that the portions of the locus object 901 gradually disappear in chronological order over time.

FIG. 9B illustrates an example of a case where a frame (range object) 903 indicating the line-of-sight range 505c of the chief referee 401 is superimposed and displayed on the virtual viewpoint image 900. In the example of FIG. 9B, the range object 903 indicating the line-of-sight range 505c of the chief referee 401 at the time t1 is superimposed and displayed on the virtual viewpoint image 900. In this manner, the line-of-sight range at each time is superimposed and displayed as the range object 903 on the virtual viewpoint image 900, so that the user can know the gaze range of the chief referee 401 while having a bird's eye view of the visual field of the chief referee 401.

FIG. 9C illustrates an example of a case where the visual field range of the chief referee 401 is displayed on the virtual viewpoint image 900 using picture-in-picture (PiP). In the example of FIG. 9C, an image region of the line-of-sight range of the chief referee 401 at the time t1 (e.g., the line-of-sight range 503 in FIG. 5B) is trimmed from the virtual viewpoint image 900, and the trimmed image region is superimposed and displayed as a window object 904 on the virtual viewpoint image 900. Such superimposition and display using PiP produces advantageous effects similar to those described above. While the image region of the line-of-sight range is trimmed from the virtual viewpoint image 900 in the above-described example, the configuration is not limited thereto. For example, the estimation unit 203 may separately generate virtual camera parameters equivalent to the angle of view of the line-of-sight range of the chief referee 401, and the image generation unit 205 may generate the virtual viewpoint image 900 on which information based on the generated virtual camera parameters is superimposed and displayed similarly to the window object 904. While the window object 904 is superimposed and displayed on the virtual viewpoint image 900 in the above-described example, the window object 904 may be separately displayed on a display device different from the display unit (display device) 206 that displays the virtual viewpoint image 900.

Figure 10A:
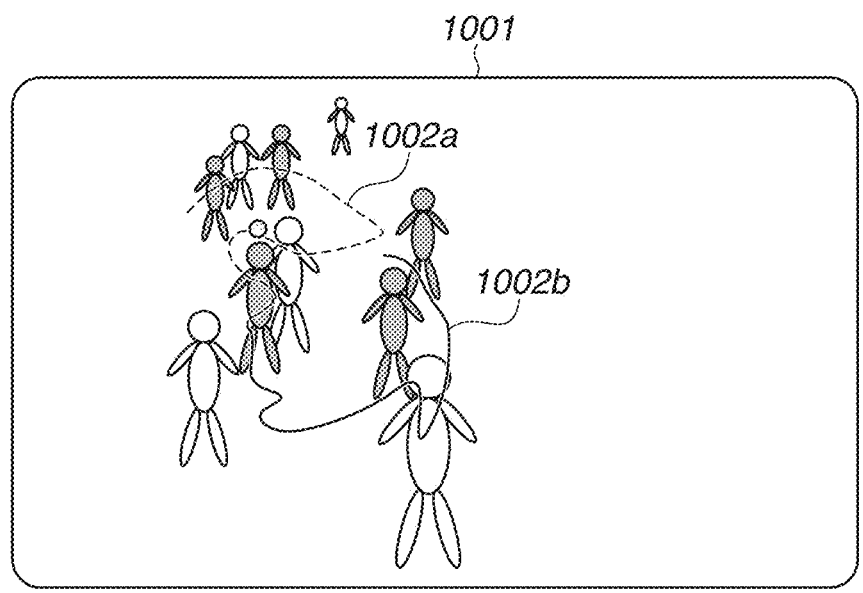
FIGS. 10A and 10B are diagrams each illustrating an example of a graphical display of the line-of-sight range.
Figure 10B:
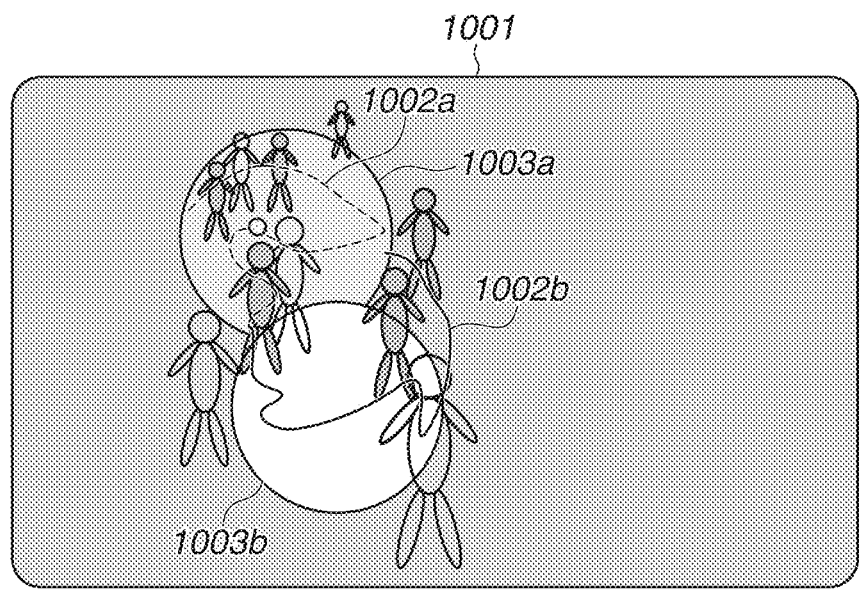

FIGS. 10A and 10B schematically illustrate an example of a display method in which the luminance of the image region indicating the line-of-sight range is changed on a virtual viewpoint image 1001 so as to correspond to the locus of the line of sight, thereby presenting to the user a change in the line of sight of the person designated as the line-of-sight extraction target.

The virtual viewpoint image 1001 is generated so as to correspond to the line of sight from the position of the chief referee 401 and to have a wider viewing angle than an average human viewing angle. For example, the virtual viewpoint image 1001 may be an image assumed to be captured by using an ultrawide lens having a wide angle of view, a fisheye lens, or a lens of a 360-degree camera having an angle of view covering the entire surroundings.

In FIGS. 10A and 10B, a locus 1002a indicates the locus of the line of sight between the time t1-1 to the time t1, and a locus 1002b indicates the locus of the line of sight between the time t1 and the time t2. In FIG. 10B, a line-of-sight range 1003a indicates the line-of-sight range estimated at the time t1, and a line-of-sight range 1003b indicates the line-of-sight range estimated at the time t2. The line-of-sight ranges 1003a and 1003b are determined using a method similar to the method used to determine the inclusive line-of-sight range 506.

Assuming that the current time is the time t2, the graphics generation unit 701 adjusts the luminance of the region of the line-of-sight range 1003b estimated at the time t2 so that the luminance has a higher (brighter) value than that of the luminance of the region of the line-of-sight range 1003a at the time t1 earlier than the time t2. The graphics generation unit 701 also adjusts the luminance of the line-of-sight range 1003a at the time t1 so that the luminance gradually has a lower (darker) value with the passage of time. The luminance decrease time may be an elapsed time in real world or an elapsed virtual time based on the timecode of the virtual viewpoint image. The graphics generation unit 701 further decreases (darkens) the luminance of the region other than the line-of-sight ranges 1003a and 1003b, i.e., the region to which the line of sight of the chief referee 401 is not directed.

While in the example of FIG. 10B, the line-of-sight ranges 1003a and 1003b are circular regions each including the locus of the line of sight, the shape is not limited to this example, and a region of any shape such as a rectangular region illustrated in FIGS. 5D and 5E or an elliptical region may be employed. In addition, the graphics generation unit 701 may change not only the luminance of the regions indicating the line-of-sight ranges but also the shapes of the regions with the passage of time. Furthermore, the graphics generation unit 701 may move the circular or rectangular regions of a predetermined size indicating the line-of-sight ranges, along the loci 1002a and 1002b of the line of sight. While in the above-described example, the luminance of the line-of-sight range 1003a at the time t1 is entirely and uniformly darkened in the region, the luminance may be changed, for example, so as to have gradations corresponding to the locus of the line of sight. While the graphics generation unit 701 changes the luminance of the line-of-sight ranges 1003a and 1003b and the virtual viewpoint image 1001 in the example of FIG. 10B, the luminance may be changed by the image generation unit 205.

As described above, in the present exemplary embodiment, information related to the line of sight of the designated person such as the line of sight, the locus of the line of sight, and the line-of-sight range is graphically displayed and presented to the user. Thus, in the present exemplary embodiment, it is possible to not only reduce an intensive movement in the virtual viewpoint image corresponding to the line of sight of the person designated as the line-of-sight extraction target, similarly to the first exemplary embodiment, but also clearly present the direction of the line of sight at a given time to the user.

The various types of graphical displays according to the present exemplary embodiment may be partially or entirely combined as needed. For example, the display for changing the luminance of the virtual viewpoint image as illustrated in FIG. 10B and the graphical display of the locus object 901, the range object 903, and the window object 904 may be performed simultaneously. Alternatively, the object to be displayed may be changed as needed based on a user's instruction.

While in the present exemplary embodiment, the image processing apparatus 700 has been described to include the image generation unit 205, the display unit 206, and the graphics generation unit 701, the configuration is not limited thereto. For example, at least one of the image generation unit 205, the display unit 206, and the graphics generation unit 701 may be externally connected to the image processing apparatus 700, as a separate device. Furthermore, the image generation unit 205, the display unit 206, and the graphics generation unit 701 may be formed integrally or separately. In other words, the image processing apparatus 700 at least determines virtual camera parameters using the estimation unit 203, and outputs the virtual camera parameters to a processing unit or another device configured to generate a virtual viewpoint image, similarly to the image processing apparatus 100 according to the first exemplary embodiment.

According to the above-described exemplary embodiments, a virtual viewpoint image suitable for use in viewing can be generated.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. An image processing apparatus comprising:
   one or more memories; and
   one or more processors in communication with the one or more memories, wherein the one or more processors and the one or more memories are configured to:
   acquire line-of-sight information about a movement range of a line of sight of a subject imaged by a plurality of image capturing apparatuses, based on a movement locus of the line of sight of the subject in a predetermined time range;
   determine virtual viewpoint information indicating a virtual viewpoint related to a virtual viewpoint image that is based on a plurality of captured images acquired by the imaging by the plurality of image capturing apparatuses and that includes the movement range of the line of sight of the subject identified based on the line-of-sight information; and
   output the virtual viewpoint information,
   wherein in a case where the virtual viewpoint information includes information that causes change of a visual field size of the virtual viewpoint to a narrow angle, the one or more processors and the one or more memories are further configured to gradually change the visual field size, and
   wherein the one or more processors and the one or more memories are further configured to acquire the line-of-sight information about the movement range of the line of sight, based on a plurality of the movement loci of the line of sight that is respectively acquired in a first predetermined time range and a second predetermined time range each of which is the predetermined time range.

2. The image processing apparatus according to claim 1, wherein the one or more processors and the one or more memories are further configured to determine the virtual viewpoint information based on the line-of-sight information acquired based on the plurality of movement loci of the line of sight.

3. The image processing apparatus according to claim 2, wherein the one or more processors and the one or more memories are further configured to gradually change the virtual viewpoint information between first virtual viewpoint information determined to correspond to the first predetermined time range and second virtual viewpoint information determined to correspond to the second predetermined time range that is shifted by the predetermined time range from the first predetermined time range.

4. The image processing apparatus according to claim 3, wherein the one or more processors and the one or more memories are further configured to determine the first virtual viewpoint information and the second virtual viewpoint information as the virtual viewpoint information for key frames, and determine the virtual viewpoint information to be complemented for each time obtained by dividing the predetermined time range by a number of frames for displaying the virtual viewpoint image, as the virtual viewpoint information to be changed gradually.

5. The image processing apparatus according to claim 1, wherein the one or more processors and the one or more memories are further configured to acquire an instruction about the predetermined time range, and update the predetermined time range based on the instruction.

6. The image processing apparatus according to claim 1, wherein the one or more processors and the one or more memories are further configured to perform control so that an image related to the line of sight of the subject is superimposed on the virtual viewpoint image corresponding to the virtual viewpoint information.

7. The image processing apparatus according to claim 6, wherein the one or more processors and the one or more memories are further configured to perform control so that an image indicating a center of the line of sight of the subject is superimposed as the image related to the line of sight of the subject.

8. The image processing apparatus according to claim 6, wherein the one or more processors and the one or more memories are further configured to perform control so that the image related to the line of sight of the subject and superimposed on the virtual viewpoint image gradually disappears with passage of time.

9. The image processing apparatus according to claim 1, wherein the virtual viewpoint information includes at least one of information indicating a position of the virtual viewpoint, information indicating a line-of-sight direction from the virtual viewpoint, or information indicating a visual field size of the virtual viewpoint.

10. The image processing apparatus according to claim 1, wherein the movement range of the line of sight is included within an effective visual field range, excluding a peripheral visual field range, of the line of sight of the subject.

11. The image processing apparatus according to claim 1, wherein the subject is a player or a referee imaged by the plurality of image capturing apparatuses.

12. The image processing apparatus according to claim 1, wherein the one or more processors and the one or more memories are further configured to generate the virtual viewpoint image based on the virtual viewpoint information.

13. An image processing method comprising:
   acquiring line-of-sight information about a movement range of a line of sight of a subject imaged by a plurality of image capturing apparatuses, based on a movement locus of the line of sight of the subject in a predetermined time range;
   determining virtual viewpoint information indicating a virtual viewpoint related to a virtual viewpoint image that is based on a plurality of captured images acquired by the imaging by the plurality of image capturing apparatuses and that includes the movement range of the line of sight of the subject identified based on the acquired line-of-sight information; and
   outputting the determined virtual viewpoint information,
   wherein in a case where the virtual viewpoint information includes information that causes change of a visual field size of the virtual viewpoint to a narrow angle, the determining gradually changes the visual field size, and
   wherein the one or more processors and the one or more memories are further configured to acquire the line-of-sight information about the movement range of the line of sight, based on a plurality of the movement loci of the line of sight that is respectively acquired in a first predetermined time range and a second predetermined time range each of which is the predetermined time range.

14. A non-transitory computer-readable storage medium storing a program for causing a computer to execute an image processing method, the method comprising:

acquiring line-of-sight information about a movement range of a line of sight of a subject imaged by a plurality of image capturing apparatuses, based on a movement locus of the line of sight of the subject in a predetermined time range;

determining virtual viewpoint information indicating a virtual viewpoint related to a virtual viewpoint image that is based on a plurality of captured images acquired by the imaging by the plurality of image capturing apparatuses and that includes the movement range of the line of sight of the subject identified based on the acquired line-of-sight information; and outputting the determined virtual viewpoint information, wherein in a case where the virtual viewpoint information includes information that causes change of a visual field size of the virtual viewpoint to a narrow angle, the determining gradually changes the visual field size, and wherein the one or more processors and the one or more memories are further configured to acquire the line-of-sight information about the movement range of the line of sight, based on a plurality of the movement loci of the line of sight that is respectively acquired in a first predetermined time range and a second predetermined time range each of which is the predetermined time range.

* * * * *